United States Patent
Hocquet et al.

(10) Patent No.: US 8,508,840 B2
(45) Date of Patent: Aug. 13, 2013

(54) DEVICE FOR REDUCING TIME DISTORTION GENERATED IN LIGHT PULSES BY A NONLINEAR OPTICAL FREQUENCY CONVERTER SYSTEM

(75) Inventors: Steve Hocquet, Talence (FR); Denis Penninckx, Cestas (FR); Claude Gouedard, Orsay (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 307 days.

(21) Appl. No.: 13/132,718

(22) PCT Filed: Dec. 21, 2009

(86) PCT No.: PCT/FR2009/052642
§ 371 (c)(1),
(2), (4) Date: Jun. 3, 2011

(87) PCT Pub. No.: WO2010/072964
PCT Pub. Date: Jul. 1, 2010

(65) Prior Publication Data
US 2011/0242643 A1 Oct. 6, 2011

(30) Foreign Application Priority Data
Dec. 22, 2008 (FR) ...................................... 08 58954

(51) Int. Cl.
*G02F 1/35* (2006.01)
(52) U.S. Cl.
USPC .............................. 359/326; 359/332; 372/21
(58) Field of Classification Search
USPC ......................................... 359/326, 328, 330
See application file for complete search history.

(56) References Cited

U.S. PATENT DOCUMENTS

| | | | |
|---|---|---|---|
| 6,327,068 B1 * | 12/2001 | Silberberg et al. | 359/239 |
| 2002/0001321 A1 * | 1/2002 | Perry | 372/22 |
| 2003/0179828 A1 | 9/2003 | Rudolph | |
| 2007/0030556 A1 * | 2/2007 | Kawanishi | 359/326 |

FOREIGN PATENT DOCUMENTS

| | | |
|---|---|---|
| EP | 0 869 675 | 10/1998 |
| EP | 1 662 655 | 5/2006 |
| GB | 2 369 735 | 6/2002 |
| WO | WO2007/112769 | 10/2007 |

OTHER PUBLICATIONS

S. Hocquet et al., "FM-to-AM conversion in high-power lasers", Applied Optics, OSA, Optical Society of America, vol. 47, No. 18, Washington, D.C., Jun. 20, 2008; "Cited in International Search Report".

(Continued)

*Primary Examiner* — Hemang Sanghavi
(74) *Attorney, Agent, or Firm* — Young & Thompson

(57) ABSTRACT

A device for reducing time distortion generated in light pulses by an optical frequency converter including at least one non-linear optical component (4) having a nonlinear optical susceptibility $\chi$ of about 2 or 3, the converter being capable of receiving at least one incident pulse light beam (2), the incident light pulses having a duration $\Delta t_0$, an optical frequency $\omega_0 \pm \Delta\omega_0$ and an intensity $I_0(t)$, and of generating, by frequency conversion, at least one output pulse beam (3), the output light pulses having a duration $\Delta t_1$, an optical frequency $\Delta_1 \pm \Delta\omega_1$ different from $\omega_0 \pm \Delta\omega_0$, and an intensity $I_1(t)$. The time distortion-reducing device includes a pre-compensation linear time filter (5) provided on the path of the incident beam (2), and capable of reducing the intensity time distortions generated in the frequency-converted output light pulses to at least one pre-compensation intensity $I_{comp}$.

10 Claims, 5 Drawing Sheets

(56) References Cited

OTHER PUBLICATIONS

Denis Penninckx et al, "Signal Propagation Over Polarization-Maintaining Fibers: Problem and Solutions", Journal of Lightwave Technology, IEEE Service Center, vol. 24, No. 11, New York, N.Y., Nov. 1, 2006; "Cited in International Search Report".

International Search Report dated May 12, 2010, in corresponding PCT application.

* cited by examiner

DEVICE FOR REDUCING TIME DISTORTION GENERATED IN LIGHT PULSES BY A NONLINEAR OPTICAL FREQUENCY CONVERTER SYSTEM

The present invention relates to frequency-converted pulsed lasers.

More particularly, the invention relates to a device for reducing temporal distortions induced in high-power (as for example in the MegaJoule Laser or "LMJ" (stands for "Laser MegaJoule" in French)) or very-short (picosecond or sub-picosecond) pulses by an optical frequency converter system. These distortions come in particular from FM-AM conversion.

Lasers emit at well-defined wavelengths that are function of the laser medium used. To obtain laser pulses at an optical frequency different from that of the source, the interaction of an intense light beam with a nonlinear optical material having a nonlinear optical susceptibility $\chi$ of the order of 2 or 3 is rather often used to obtain, by optical frequency conversion, an output beam of a frequency different from that of the incident beam. The frequency conversion is a nonlinear process for converting a light wave of frequency $\omega$ into a multi-frequency wave, typically $2\omega$, $3\omega$ or $4\omega$. For a low intensity, the output wave of the converter remains sinusoidal and no new frequency is created. At a higher intensity, the output wave also comprises harmonic frequencies $2\omega$, $3\omega$, etc. In general, the first harmonics are the strongest but certain harmonics may disappear under condition of small-scale symmetry of the material. In general, these new frequencies remain at very low levels because the waves reemitted at different points in space are not in phase with each other and annihilate each other. In order for the process to be constructive, a "phase matching" is necessary, that is to say the waves must have identical phase velocities. This method permits to convert a frequency $\omega$ into one of its harmonics.

A first type of frequency conversion is the frequency doubling (or second harmonic generation, SHG), which permits, from a laser beam with an initial wavelength, to obtain laser pulses at a wavelength equal to half this initial wavelength: it is therefore possible, from an infrared beam, to generate pulses in the visible or near-UV domain. A second type of frequency conversion is the frequency summing (or sum frequency generation, SFG), which permits, from two beams at different frequencies, to obtain a beam whose frequency is the sum of the frequencies of the incident beams. Hence, as for example in the LMJ, pulses of $3\omega$ (or 351 nm) can be obtained from a mixture of waves of frequencies $2\omega$ (526 nm) and $\omega$ (1053 nm), respectively.

So, the combination of different types of frequency conversion permits to obtain laser pulses at wavelengths that cannot be generated directly.

The phase matching exists only for certain crystals, at certain frequencies $\omega$ and for certain incidence angles. Moreover, it is perfect for only one frequency $\omega$: around the latter, the efficiency of the frequency conversion decreases according to a sin c law (with sin $c(x)=(\sin(x))/x$) when the intensity is moderated. Therefore, if it is desired to convert a signal, the spectrum thereof has to be narrower than the spectral acceptance of the conversion process. As used herein, "spectral acceptance of conversion" means the maximum spectral range liable to be converted, generally defined by the frequencies for which the conversion rate is higher than 50% or 80 of the maximum of this rate. Moreover, the spectral acceptance of the conversion process varies as a function of the signal intensity. Then, if the signal to be converted presents variations of intensity—which is the most frequent case—the spectral acceptance evolves during the pulse: the transfer function of the frequency conversion is highly nonlinear.

Hence, a nonlinear optical material permits the frequency conversion only in very particular conditions for laser pulses of precise initial frequency and sufficient intensity. The frequency conversion transfer function of a nonlinear optical material has a limited spectral acceptance.

A nonlinear crystal has to be judiciously chosen for:
permitting the phase matching to be obtained;
being transparent to the working frequencies;
resisting to the light flows it will undergo;
its dimensions;
its angular opening;
its tolerance to temperature variations, in particular those due to its own temperature rise;
its spectral acceptance that must let through all the spectrum of the pulses to be converted.

Therefore, an ideal crystal does not exist and the choice depends on the application. The spectral acceptance may thus be finally a limiting factor in the frequency conversion. For example, KTP (potassium titanyl phosphate crystal) is used for the frequency doubling of certain lasers so as to take advantage of the great angular tolerance thereof, but the spectral acceptance is then low. Accordingly, signals whose spectrum is too wide, i.e. wider that the spectral acceptance, cannot be converted. Indeed, the signal then undergoes very strong distortions over time, which are greatest than the simple distortions related to the frequency conversion process for a signal whose spectrum would be far narrower than the spectral acceptance of the frequency conversion.

In very-high-power pulsed lasers, the pulses are relatively long (of the order of the nanosecond). A part of the energy of the frequency-converted pulse undergoes a parasitic FM-AM conversion that introduces amplitude and/or phase distortions in the laser signal. This phenomenon of FM-AM conversion is itself a nonlinear effect as a function of the incident beam intensity.

The FM-AM conversion is a problem in the high-power lasers such as the MegaJoule Laser (LMJ), because it may hinder the fusion-ignition (S. Hocquet et al. Applied Optics, Vol. 47, No 18, June 2008, p. 3338-3349). In the LMJ, the FM-AM conversion mainly comes from the frequency conversion and focusing system (SCF), which is a nonlinear optical system. The LMJ is provided to generate very-high-energy pulses (up to 2 MJ in a few nanoseconds). The pulses of the LMJ are phase modulated so as to widen the optical spectrum thereof. Ideally, this modulation is purely a phase modulation. However, upon the passage through the different optical components of the laser chain, the spectrum of the pulses is not perfectly transmitted: it is filtered. The FM modulation is partially converted into intensity modulation or AM. This AM modulation produces distortions of the temporal shape of the laser pulses.

The distortion factor $\alpha$ may reach several tenths of percent (10-40%). The publication Hocquet et al. (Applied optics 2008) shows that a frequency tripler may generate a FM-AM distortion of 40%, which is very cumbersome for triggering the fusion-ignition. It is essential to reduce at best this distortion $\alpha$, in particular to avoid damaging the optical components.

Nowadays, the solid or optical-fiber pulsed lasers find a great number of applications. Such lasers also use frequency conversion systems. Even if the energy of the pulses does not reach that of the LMJ, the temporal distortions are also cumbersome because they introduce a temporal stretching of the output pulses.

In a very-high-power laser, such as the MegaJoule Laser, the first part of the pulse is of relatively low power and the second part (square) is of very high power. Therefore, the distortions are not the same all along the pulse (cf. FIG. 1).

In the ultra-short (picosecond or sub-picosecond) pulsed lasers, of lower power than the LMJ, the temporal distortions appear in the form of a temporal stretching of the pulses after frequency conversion (cf. FIG. 2).

It is possible to analytically cancel the FM-AM conversion in linear systems by introducing a reverse transfer function. However, the use of such methods in nonlinear systems or the fact that they permit to obtain as good a compensation as in linear systems is not conceived.

Only a nonlinear compensation opposite to the nonlinear transfer function of the frequency converter would be capable to exactly compensate for the temporal distortions induced by the frequency conversion.

Besides, the optical components placed in the beam path after a frequency converter also induce FM-AM distortions, even if the transfer function thereof is linear. Thus, the SCF of the LMJ comprises a diffraction grating arranged before the frequency converter. This diffraction grating induces a chromatic dispersion that has for effect to introduce a different cumulated phase in the signal spectrum, including after the frequency conversion, and also translates into distortions in the output signal intensity. This phase distortion is linear after frequency conversion, i.e. it does not depend on the signal intensity. Thus, it is theoretically easy to compensate for it afterwards. However, because of the high energy of the beam, this solution is not conceivable.

A linear pre-compensation function is itself nonlinearly transformed by the frequency converter. Therefore, the linear spectral distortion of the phase after frequency conversion has to be considered as nonlinear if it is to be pre-compensated. But it is difficult to anticipate the effect of a nonlinear transformation on a linear function. So, it is not obvious that a linear transfer function can improve the distortions induced by a nonlinear transfer function.

One object of the invention is to reduce the intensity temporal distortions of FM-AM conversion in high-power or very-short laser pulses issuing from a nonlinear optical frequency converter. Generally, the device of the invention applies to any signal whose intensity is sufficient so that the frequency conversion process is efficient and whose spectrum is wider than the spectral acceptance of the frequency conversion.

The invention relates to a device for reducing the temporal distortions induced in light pulses by an optical frequency converter system, said system comprising at least one nonlinear optical component having a nonlinear optical susceptibility $\chi$ of the order of 2 or 3, said converter system being capable of receiving at least one incident pulsed light beam, the incident light pulses having a duration $\Delta t_0$, an optical frequency $\omega_0 \pm \Delta\omega_0$ and an intensity $I_0(t)$, and of generating, by frequency conversion, at least one output pulsed beam, the output light pulses having a duration $\Delta t_1$ an optical frequency $\omega_1 \pm \Delta\omega_1$ different from $\omega_0 \pm \Delta\omega_0$, and an intensity $I_1(t)$ that is a function of $I_0(t)^\beta$, $\beta$ being a coefficient of saturation of the frequency converter. According to the invention, said device for reducing the temporal distortions comprises a pre-compensation linear temporal filter arranged in the path of the incident beam of optical frequency $\omega_0$, and capable of reducing, around at least one compensation intensity $I_{comp}$, the intensity temporal distortions induced in said frequency-converted output pulses.

The invention also relates to the different following technical elements, which may be used alone or in any technically possible combination:
the pre-compensation linear temporal filter is capable of reducing the temporal distortions in the light pulses over a range of compensation intensity $I_{comp}$;
the pre-compensation linear temporal filter is capable of introducing an amplitude pre-compensation as a function of the optical frequency f of the form:

$$H_{ccomp}(f) = 1 + \frac{\gamma_{comp}^2}{6} f^2$$

where $\gamma_{comp} = (\omega_1/\omega_0) \cdot \gamma/\sqrt{\beta}$, $\gamma$ being the spectral acceptance of the frequency converter for an intensity $I_{comp}$;
the pre-compensation linear temporal filter is a two-wave or multiple-wave interferometer;
the pre-compensation linear temporal filter is a free space (Michelson or Fabry-Perot), thin-film, integrated optics (phasar) or optical fiber interferometer;
the pre-compensation linear temporal filter is a filter having a phase transfer function of the form:

$$H_{dcomp}(f) = \exp\left[-\frac{i}{2}\varphi_{2comp} \cdot f^2\right]$$

where $\phi_{2comp} = \phi_2/\beta$, $\phi_2$ being the chromatic dispersion of the phase transfer function to be compensated;
the pre-compensation filter comprises a chirped Bragg grating fiber, a phasar, a diffraction grating or a dispersive optical fiber.

The invention also relates to an optical frequency converter system for generating a beam at a frequency $\omega_1$ that is a multiple of the frequency $\omega_0$ of the incident beam and comprising a device for reducing the temporal distortions according to one of the embodiments described.

The invention also relates to a nonlinear optical frequency converter system for receiving two incident pulsed light beams of optical frequency $\omega_0$ et $\omega'_0$, respectively, and for generating by frequency summing or differencing a beam whose frequency $\omega_1$ is equal to a linear combination of the incident frequencies $\omega_0$ and $\omega'_0$, said system comprising a device for reducing the temporal distortions according to one of the embodiments described.

The invention also relates to a parametric optical generator comprising a nonlinear optical converter capable of receiving an incident pulsed light beam of frequency $\omega_0$ and of generating two output pulsed light beams of optical frequencies $\omega_1$ and $\omega'_1$, respectively, and comprising a device for reducing the temporal distortions according to one of the embodiments described.

The invention relates to a high-power pulsed laser comprising a nonlinear optical frequency converter and a device according to the invention capable of reducing the distortions of FM-AM conversion induced in the frequency-converted laser pulses.

Finally, the invention relates to a sub-picosecond pulsed laser comprising a frequency converter and a device according to the invention capable of reducing the distortions of temporal stretching induced in said sub-picosecond pulses by frequency conversion.

The present invention also relates to the features that will become evident from the following description and that will have to be considered either alone or in any technically possible combination thereof.

The present description is given only by way of non-limitative example and will permit to better understand how the invention can be implemented with reference to the appended drawings, in which.

Figure 5:
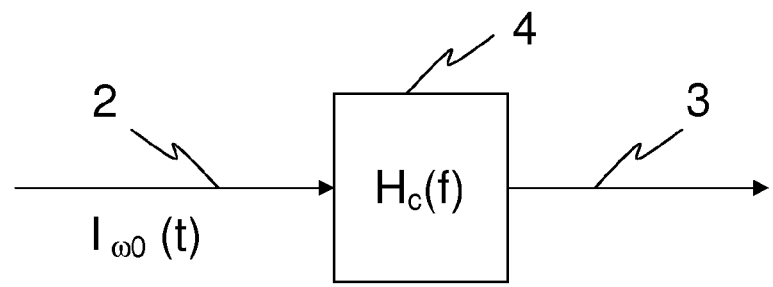
Figure 6:
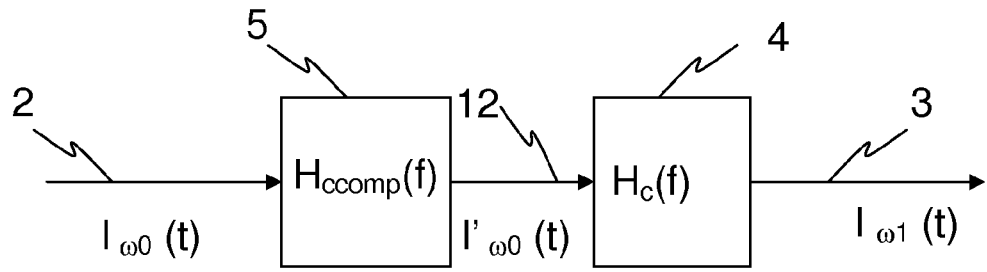
Figure 7:
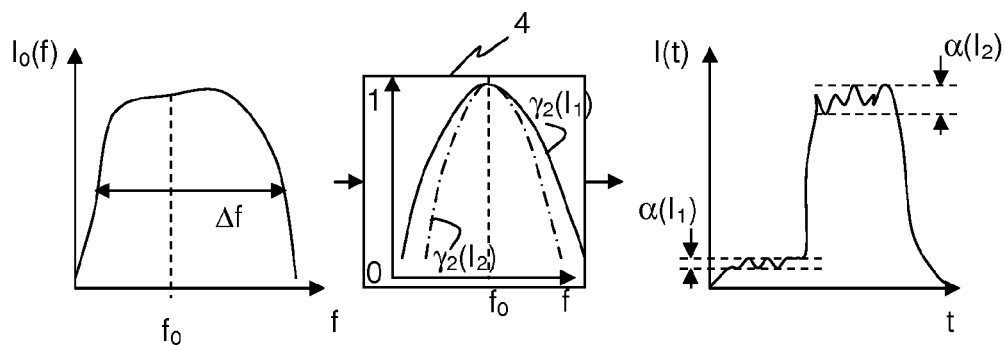
Figure 8:
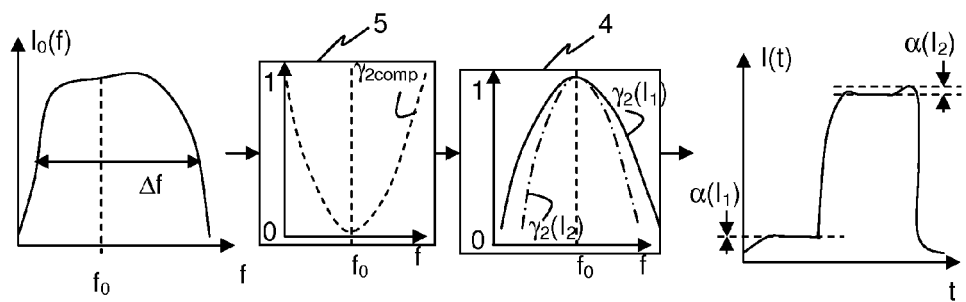
Figure 9:
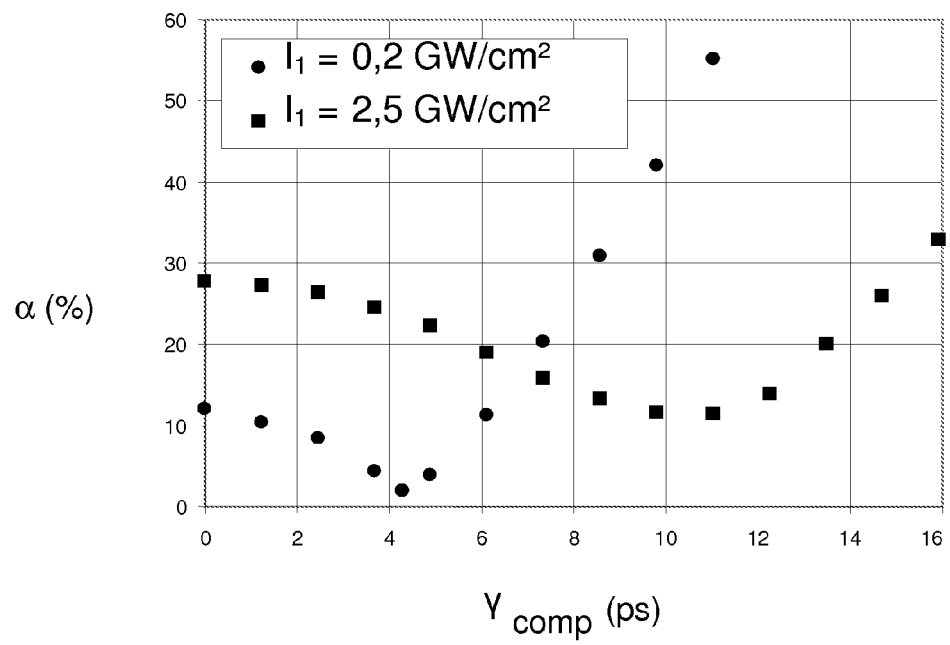
Figure 10:
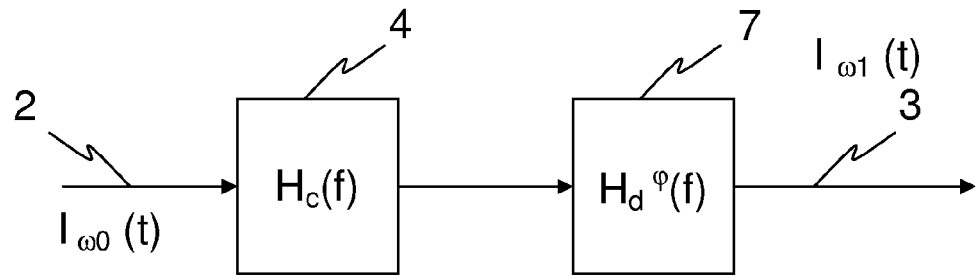
Figure 11:
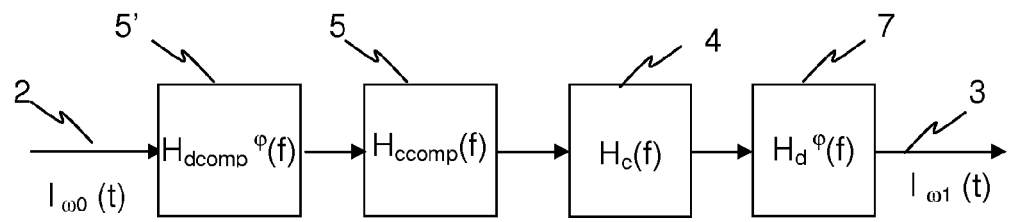
Figure 12:
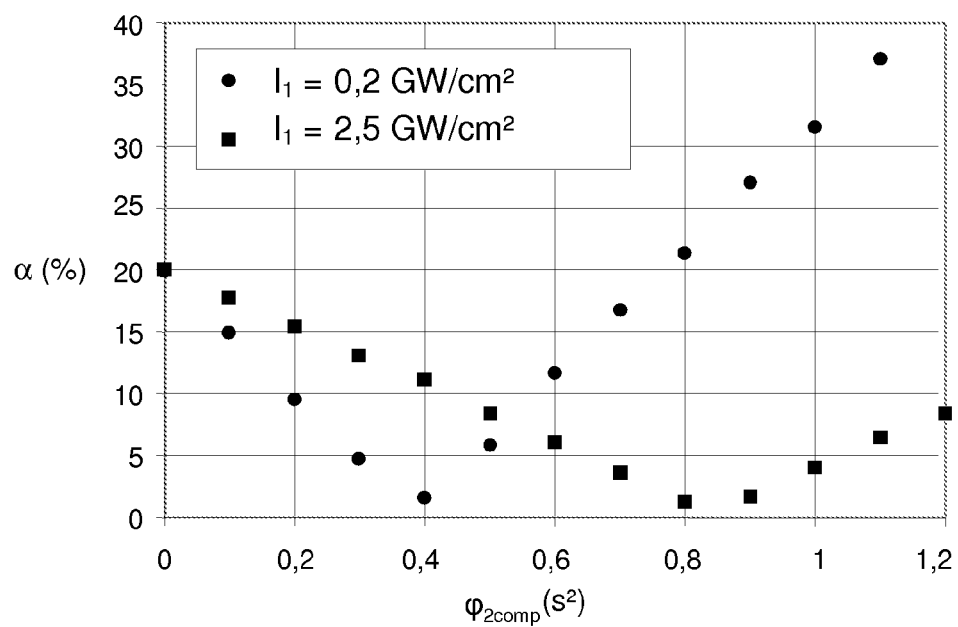

FIG. 5 schematically shows a nonlinear optical frequency converter;

FIG. 6 schematically shows a device according to the invention, a filter for amplitude pre-compensation of the temporal distortions upstream a nonlinear optical frequency converter system;

FIG. 7 schematically shows a wide-spectrum light signal at the input of a nonlinear frequency conversion system whose spectral acceptance varies as a function of the signal intensity and the temporal distortions of the signal induced after frequency conversion;

FIG. 8 schematically shows a wide-spectrum light signal that is filtered by a pre-compensation linear filter upstream the nonlinear frequency conversion system and the effect of reduction of the temporal distortions of the pulse after frequency conversion;

FIG. 9 shows the variations of the coefficient $\alpha$ of temporal distortion of a pulse of the LMJ type for two levels of laser intensity as a function of the coefficient $\gamma_{comp}$ of compensation of the linear filter for amplitude pre-compensation;

FIG. 10 schematically shows a nonlinear optical frequency converter followed by a system introducing nonlinear distortions of the phase of the frequency-converted signal;

FIG. 11 schematically shows a device according to the invention comprising a filter for phase pre-compensation and a filter for amplitude pre-compensation, upstream a nonlinear optical frequency converter system;

FIG. 12 shows the variations of the coefficient $\alpha$ of temporal distortion of a pulse of the LMJ type for two levels of laser intensity as a function of the coefficient $\phi_{2comp}$ of phase compensation of the linear filter for amplitude pre-compensation.

An application of the invention in a frequency converter system for a very-high-power laser and in particular the LMJ will now be described. The example of the LMJ will be used hereinafter, but the invention also applies to the frequency conversion of short, typically picosecond, pulses or generally to the frequency conversion of any signal whose intensity is sufficient so that the frequency conversion process is efficient and whose spectrum is wider that the spectral acceptance of the frequency conversion.

Figure 3:
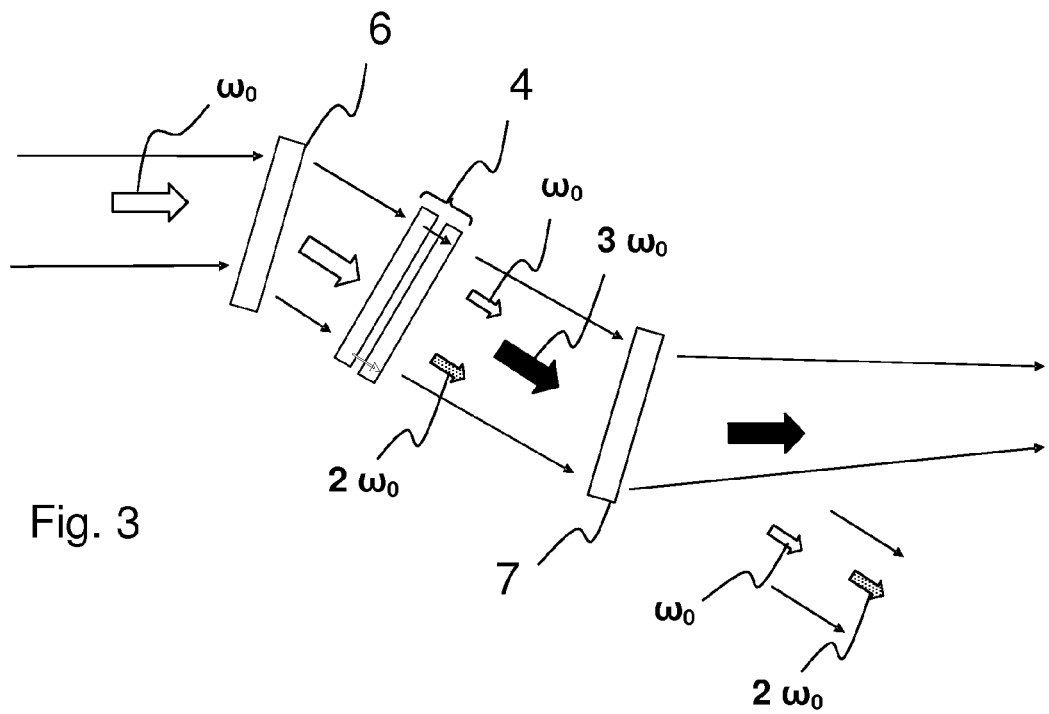
FIG. 3 shows a device for tripling the optical frequency and focusing a beam of the LMJ.

FIG. 3 schematically shows a SCF device for tripling the optical frequency and focusing a beam of the LMJ. This device comprises a first diffraction grating 6 that receives pulses at the optical frequency $\omega_0$. A frequency converter 4 comprises two nonlinear crystals. The first crystal generates by frequency doubling a beam at the frequency $\omega_0$ and a beam at the frequency $2.\omega_0$. The second crystal carries out the sum of the frequencies $\omega_0$ and $2.\omega_0$ to generate pulses at the frequency $3.\omega_0$. A second diffraction grating 7 permits to filter the residual energy at the frequencies $\omega_0$ and $2.\omega_0$ and to focus the beam at the triple frequency ($3.\omega_0$) to the target of the LMJ.

Figure 1:
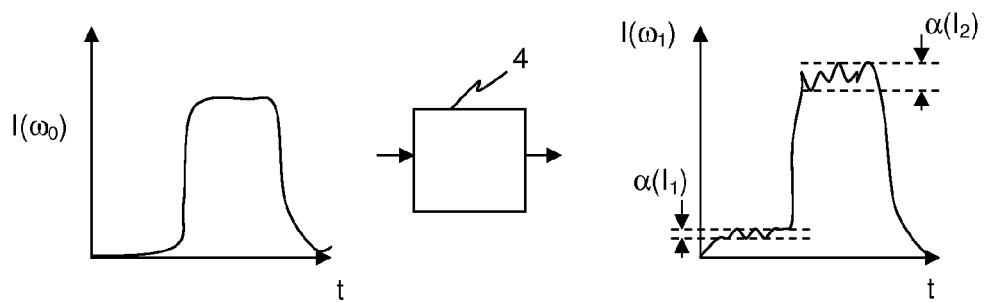
FIG. 1 illustrates the effect of the temporal distortions (FM-AM conversion) induced by frequency conversion on a very-high-power laser pulse of a few nanoseconds, such as a pulse of the LMJ.
Figure 2:
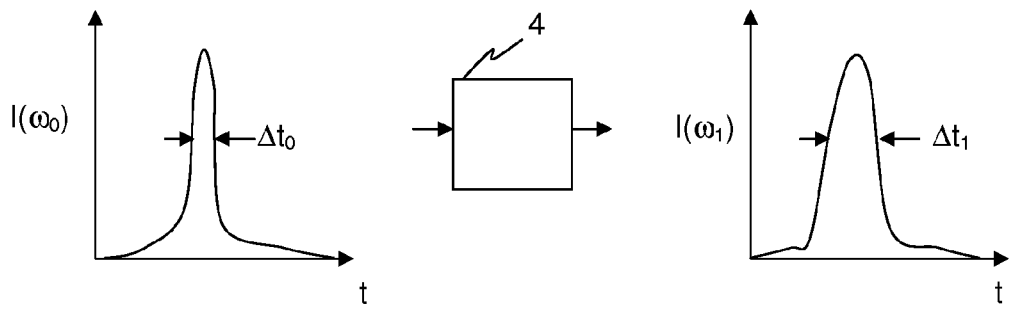
FIG. 2 illustrates the effect of the temporal distortions (stretching of the pulse width) induced by frequency conversion on an ultra-short laser pulse, such as a picosecond pulse.

FIG. 5 schematically shows the transfer function of a nonlinear optical frequency converter. The converter 4 comprises a nonlinear crystal that receives an incident pulsed light beam 2, whose incident light pulses have a duration $\Delta t_0$, of the order of a few nanoseconds, an optical frequency $\omega_0 \pm \Delta\omega_0$ and an intensity $I\omega_0(t)$. At the output of the converter is an output pulsed beam 3, the output light pulses having a duration $\Delta t_1$, an optical frequency $\Delta_1 \pm \Delta\omega_1$ and an intensity $I\omega_1(t)$. This beam 3 comprises temporal distortions induced in particular by nonlinear FM-AM conversion (cf. FIG. 1).

The transfer function of a frequency converter $H_c(f)$ is by nature a nonlinear transformation, but the device according to the invention permits to substantially reduce the temporal distortions due to a reduced spectral acceptance of the converter 4 by a judiciously chosen linear pre-compensation, whose phase and intensity shape is approximately equal to the reverse of the equivalent transfer function of the frequency conversion process at a given intensity.

FIG. 6 schematically shows the function of a device according to the invention for reducing the temporal distortions introduced by a frequency converter. This device for reducing the temporal distortions comprises a pre-compensation linear temporal filter 5. The frequency converter comprises a nonlinear crystal 4. The linear filter 5 receives an incident pulsed light beam 2, of pulses at the optical frequency $\omega_0$, of intensity $I\omega_0(t)$, and transmits a beam 12 of pulses at the unchanged optical frequency $\omega_0$, of intensity $I'\omega_0(t)$. At the output of the converter is a beam 3 of pulses at the optical frequency $\omega_1$, of intensity $I\omega_1(t)$ corrected of the temporal distortions induced by the spectral acceptance of the nonlinear frequency conversion.

The FM-AM conversion distortions of the output signal considered herein are intensity distortions resulting from amplitude or phase variations of the signal. The output signal may comprise both amplitude and phase spectral distortions.

Hereinafter, the amplitude spectral distortions will be considered first, then the phase spectral distortions.

For the LMJ, the intensity temporal distortions of the megajoule pulses are characterized by a coefficient denoted $\alpha$, which quantifies the temporal distortions of an initially phase-modulated signal and which, because of the FM-AM distortions, is modulated in intensity (cf. FIG. 1):

$$\alpha = 2 \cdot \frac{I_{max} - I_{min}}{I_{max} + I_{min}}$$

$\alpha$ varies between 0 and 200%. Ideally, $\alpha = 0$ (no distortion).

The frequency conversion (tripling of the frequency in the case of the LMJ) is likened to a filter $H_c$ defined at $3\omega$ by the function:

$$H_c(f) = \text{Sinc}(\gamma f) \approx 1 - \frac{\gamma^2}{6} f^2$$

where f is the optical frequency, and $\gamma$ is a variable related to the spectral acceptance of the optical frequency converter: the more $\gamma$ is high, the more the spectral acceptance is low.

Figure 4A:
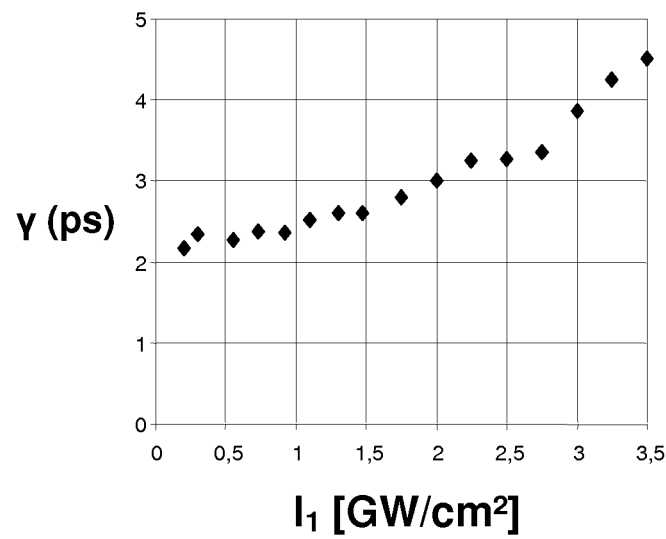
FIG. 4A illustrates the variations of the spectral acceptance ($\gamma$) of an optical frequency converter (e.g., frequency tripler) as a function of the optical intensity of the beam.

It is known that γ varies as a function of the intensity: γ increases with an increasing incident intensity, and the spectral acceptance decreases (cf. FIG. 4A).

FIG. 7 schematically shows the effect of a nonlinear frequency converter to a wide-spectrum light signal. The input light signal has a spectrum centred to the optical frequency $f_0$ and a spectrum width higher than the spectral acceptance determined by γ of the frequency converter, this spectral acceptance decreasing with the signal intensity. The output light signal schematically shown as a function of time presents great amplitude distortions α, which depend on the intensity level.

Moreover, because of the conversion process, the intensity varies according to the law:

$$I_{3\omega} \propto I_{1\omega}^{\beta}$$

where β is a coefficient of saturation of the frequency converter.

Figure 4B:
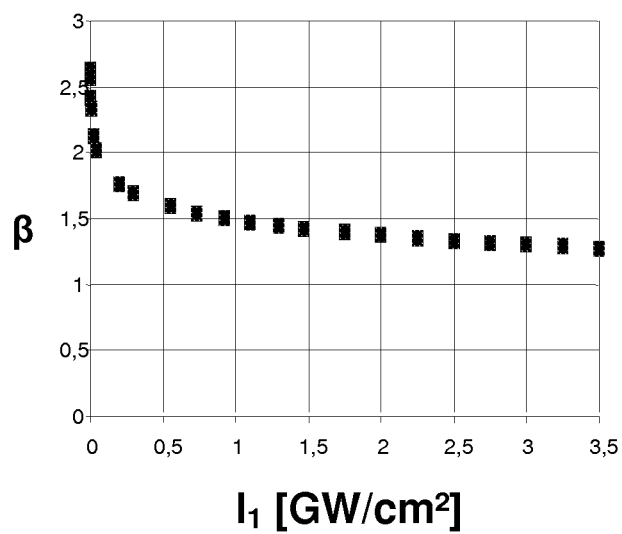
FIG. 4B illustrates the variations of the coefficient $\beta$ of a frequency optical converter (e.g., frequency tripler) as a function of the optical intensity of the beam.

In the case of the frequency tripling, β is theoretically equal to 3 at a low intensity. However, the measurement shows that β is not constant and decreases as a function of the increasing intensity because of the "saturation" due to the depletion of the incident wave (FIG. 4B).

The invention consists in partly compensating for the nonlinear transfer function of the frequency conversion by a linear transfer function of the distortion reducing system. The distortion reducing system being linear, it is therefore very simple to implement, as detailed hereinafter.

A pre-compensation linear transfer function is the opposite to the transfer function of the frequency conversion, and is defined by the function:

$$H_{ccomp}(f) = 1 + \frac{\gamma_{comp}^2}{6} f^2$$

where $\gamma_{comp}$ is a fixed coefficient of compensation (independent from the intensity).

The function $H_{comp}$ is thus effectively a linear function. FIG. 8 schematically shows the effect of the amplitude pre-compensation linear filter to a light signal having a wide frequency spectrum. The light signal passes through a pre-compensation filter 5, whose spectrum is as indicated hereinabove, before reaching the frequency converter 4. The output light signal schematically shown as a function of time presents reduced amplitude distortions α compared to a frequency conversion device without an intensity linear filter 5.

The choice of the value $\gamma_{comp}$ has to be adapted as a function of the application.

The results of this amplitude pre-compensation are illustrated in FIG. 9. When $\gamma_{comp}$ is null, there is no compensation: α is higher than 10% for a beam of 0.2 GW/cm² and higher than 30% for a beam of 2.5 GW/cm², respectively. This AM modulation of the beam is therefore negligible. The variations of α as a function of $\gamma_{comp}$ are firstly decreasing, until reaching a minimum value, then they increase again. From the variations of α shown in FIG. 9, it can be observed that the introduction of a compensation $\gamma_{comp}$ permits to reduce the value of α, the factor of AM-FM modulation, at the two illustrated levels of intensity. For each value of beam intensity, a value of $\gamma_{comp}$ exists ($\gamma_{comp}$~4 ps at 0.2 GW/cm² and $\gamma_{comp}$~10 ps at 2.5 GW/cm²) that permits to minimize the coefficient α. For an intensity of 0.2 GW/cm², it is possible to almost cancel α. It is also possible to minimize α over a range of beam intensity.

According to a preferred embodiment, the optimum value of $\gamma_{comp}$ for a given intensity (i.e. corresponding to a known value of γ) is approximately equal to $3\gamma/\sqrt{\beta}$. The factor 3 is due to the frequency tripling (it would be equal to 2 for a frequency doubling). The factor β is due to the saturation.

Generally, for a frequency conversion of $\omega_0$ into $\omega_1$, the optimal value of amplitude pre-compensation is equal to:

$$\gamma_{comp} = (\omega_1/\omega_0) \cdot \gamma/\sqrt{\beta}.$$

When the signal to be converted is of variable intensity, it is possible to choose the intensity for which an optimal compensation is desired. At the other intensities, the compensation will be imperfect, but an improvement remains possible.

A pre-compensation device having an intensity-linear transfer function may be implemented in various ways. For an amplitude filter, the embodiments that are contemplated use an interferential filter with two waves or more, such as, for example:
- a free space Michelson or Fabry-Perot interferometer,
- a thin-film interferometer,
- an integrated optics interferometer (phasars),
- an optical fiber interferometer (polarisation maintaining fiber or not).

The adjustment of the path-length difference between the interferometer, channels permits to obtain the desired value of $\gamma_{comp}$.

According to the preferred embodiment, a two-wave interferometer is used, which operates for a linearly polarized signal. This two-wave interferometer comprises a half-wave plate, a polarisation maintaining optical fiber and a polarizer. Such an interferometer introduces a linear temporal filter.

The linear filter of the invention is placed upstream the frequency converter nonlinear crystal in the optical path of the incident pulsed light beam, so as to introduce a pre-compensation.

Thanks to a linear temporal pre-compensation, it is also possible to compensate, before frequency conversion by a linear transfer function, for all or part of a linear (or nonlinear) transfer function occurring after the frequency conversion. A linear transfer function after frequency conversion has to be considered, before frequency conversion, as a nonlinear transfer function. Indeed, the pre-compensation consists in pre-distorting a signal in a reverse manner with respect to the transfer function that follows it. In the case where a frequency conversion function comes in between both of them, the pre-distortions are nonlinearly modified by the frequency conversion.

The compensation of the phase distortions of a frequency-converted signal will now be considered.

In the case of the LMJ, a diffraction grating 6 placed before the frequency converter 4 is used. The grating 6 naturally introduces a chromatic dispersion effect in the spectrum of the signal before and after the frequency conversion. This chromatic dispersion translates into a variable cumulated phase in spectrum of the signal at 3ω. But this variation of the phase after frequency tripling varies nonlinearly over the spectrum (in other words, as a function of the optical frequency) according to the following function:

$$\varphi(f) = \varphi_0 + \varphi_1 f + \frac{1}{2}\varphi_2 f^2 + o[f^2]$$

i.e.:

$$H_d^{\varphi}(f) \approx \exp\left[\frac{i}{2}\varphi_2 \cdot f^2\right]$$

because $\phi_0$ and $\phi_1$ generate no distortion. Therefore, in FIG. 12, the compensation of the chromatic dispersion before the frequency conversion at $\omega_0$, which is a linear phenomenon whose compensation is perfectly known, has not been integrated. $H_d^{\Phi}$ is the phase transfer function through the frequency converter system followed with a dispersion grating. These nonlinear phase variations also produce a temporal distortion α of the signal intensity.

The transfer function of the frequency converter system is schematically shown in FIG. 10. The frequency converter system comprises at least one nonlinear frequency converter crystal 4 whose transfer function is $H_c(f)$, and an optical component 6 whose transfer function introduces a phase shift $H_d^\Phi(f)$.

FIG. 11 schematically shows the transfer function of a linear pre-compensation device according to the invention, comprising a linear filter 5 for amplitude pre-compensation $H_{ccomp}(f)$ and a filter 5' for phase pre-compensation filter $H_{dcomp}^\Phi(f)$. The two filters 5 and 5' being linear, they can be inverted.

According to the invention, a pre-compensation by a phase function of the form:

$$H_{dcomp}(f) = \exp\left[-\frac{i}{2}\varphi_{2comp} \cdot f^2\right],$$

provides the variations of α as a function of the coefficient $\phi_{2comp}$ of phase compensation of the pre-compensation linear filter shown in FIG. 12 for two values of beam intensity (respectively, 0.2 GW/cm² and 2.5 GW/cm²).

The origin of the abscissas (i.e. when ($\phi_{2comp}$ is null) of FIG. 12 corresponds to the non-compensated case: α is of the order of 20% whatever the intensity of the beam. From the variations of α shown in FIG. 12, it can be observed that the introduction of a compensation $\phi_{2comp}$ permits to reduce the values of α, the factor of AM-FM modulation, at the two shown levels of intensity. For each value of beam intensity, a value of $\phi_{2comp}$ exists that permits to minimize the coefficient α. For an intensity of 0.2 GW/cm², it is possible to cancel α. It is also possible to minimize α over a range of beam intensity.

Again $\phi_2$ and the optimal value of $\phi_{2comp}$ at a given intensity are related together. An approximate relation between $\phi_{2comp}$ and $\phi_2$ is given by:

$\phi_{2comp} = \phi_2/\beta$.

The compensation is not perfect because it depends on the intensity of the signal. However, a value of $\phi_{2comp}$ exists where α is minimum for each intensity.

According to various embodiments, it is possible to optimize the compensation, either at an intensity, or over a range of intensities.

For a phase transfer function, the preferred embodiment uses a dispersive fiber having a length and a chromatic dispersion adapted to the phase delay that is desired to be introduced before the frequency conversion. A chirped Bragg grating, a phasar or diffraction gratings may also be used.

In the case of the LMJ, the temporal distortions of the signal come from both the intensity transfer function $H_c$ and the phase transfer function $H_d^\Phi$. It is possible to place a linear filter for phase pre-compensation and a linear filter for amplitude pre-compensation upstream the frequency converter. Both filters being linear, their position can be inverted.

The temporal linear filter(s) of the invention is(are) placed upstream the frequency converter nonlinear crystal in the optical path of the incident pulsed light beam, to introduce a pre-compensation before the nonlinear transfer function of frequency conversion.

The invention permits to reduce the intensity temporal distortions of very-high-power or ultra-short frequency-converted laser pulses.

The invention thus permits to partly compensate for the nonlinear transfer function of the frequency conversion by a linear transfer function, and is rather simple to implement. It is to be noted that the compensation is not perfect and must be adapted to the intensity level. If the intensity of the signal varies over time (which is the most frequent case), it is advisable to choose the intensity for which the best compensation is desired. Therefore, in the MegaJoule Laser, it is possible to choose to compensate the distortions rather in the low-intensity part of the pulse or rather in the high-intensity part of the pulse.

The invention permits to determine the type of filter (amplitude and/or phase) to be placed upstream the frequency converter. The invention also permits to anticipate the filtering function (value of the intensity phase-shift or modulation) to be introduced in order to efficiently pre-compensate for the nonlinear distortions. The functions of these filters do not directly ensue from the values to be compensated, but depend on the coefficient β of saturation of the frequency converter.

Likewise, for very-short pulses, the compensation depends on the pulse intensity: the correction of the temporal stretching of the pulses can be optimized for pulses of a given intensity.

The effective spectral acceptance of the frequency converter optical system is therefore improved for a given intensity.

The invention claimed is:

1. A device for reducing the temporal distortions induced in light pulses by an optical frequency converter system, said system comprising at least one nonlinear optical component (4) having a nonlinear optical susceptibility χ of the order of 2 or 3, said converter system being capable of receiving at least one incident pulsed light beam (2), the incident light pulses having a duration $\Delta t_0$, an optical frequency $\omega_0 \pm \Delta\omega_0$ and an intensity $I_0(t)$, and of generating, by frequency conversion, at least one output pulsed beam (3), the output light pulses having a duration $\Delta t_1$, an optical frequency $\omega_1 \pm \Delta\omega_1$ different from $\omega_0 \pm \Delta\omega_0$, and an intensity $I_1(t)$ that is a function of $I_0(t)^\beta$, β being a coefficient of saturation of the frequency converter, characterized in that said device comprises:
a linear temporal filter (5) for amplitude pre-compensation arranged in the path of the incident beam (2) and capable of introducing an amplitude pre-compensation as a function of the optical frequency f of the form:

$$H_{ccomp}(f) = 1 + \frac{\gamma_{comp}^2}{6}f^2$$

where $\gamma_{comp} = (\omega_1/\omega_0) \cdot \gamma/\sqrt{\beta}$, γ being the spectral acceptance of the frequency converter for an intensity $I_{comp}$, so as to reduce, at at least one compensation intensity $I_{comp}$, the intensity temporal distortions induced in said frequency-converted output light pulses.

2. A device according to claim 1, characterized in that the linear temporal filter (5) for amplitude pre-compensation is capable of reducing the temporal distortions in the light pulses over a range of compensation intensity $I_{comp}$.

3. A device according to claim 1, characterized in that said amplitude pre-compensation filter (5) is a free space (Michelson or Fabry-Perot), thin-film, integrated optics (phasar) or optical fibers interferometer with two waves or more.

4. A device according to claim 1, characterized in that it further comprises a linear temporal filter (5') for phase pre-compensation having a phase transfer function of the form:

$$H_{dcomp}(f) = \exp\left[-\frac{i}{2}\varphi_{2comp} \cdot f^2\right]$$

where $\phi_{2comp}=\phi_2/\beta$, $\phi_2$ being the chromatic dispersion of the phase transfer function to be compensated.

5. A device according to claim 4, characterized in that said phase pre-compensation filter (5') comprises a filter chosen from the following: a chirped Bragg grating fiber, a phasar, diffraction gratings and a dispersive optical fiber.

6. A nonlinear optical frequency converter system for generating an output beam at a frequency $\omega_1$ that is a multiple of the frequency $\omega_0$ of the incident beam, characterized in that it comprises a device for reducing the temporal distortions according to claim 1.

7. A nonlinear optical frequency converter system by frequency summing capable of receiving two incident pulsed light beams (2, 2') of optical frequency $\omega_0$ et $\omega'_0$, respectively, and of generating by frequency summing an output beam whose frequency $\omega_1$ is equal to a linear combination of the incident frequencies $\omega_0$ and $\omega'_0$, said converter being characterized in that it comprises a device for reducing the temporal distortions according to claim 1.

8. A parametric optical generator comprising a nonlinear optical converter capable of receiving an incident pulsed light beam (2) of frequency $\omega_0$ and of generating two output pulsed light beams of optical frequencies $\omega_1$ and $\omega'_1$, respectively, and characterized in that it comprises a device for reducing the temporal distortions according to claim 1.

9. A high-power pulsed laser comprising a nonlinear optical frequency converter and characterized in that it comprises a device for reducing the induced temporal distortions according to claim 1, capable of reducing the distortions of FM-AM conversion induced in the frequency-converted laser pulses.

10. A sub-picosecond pulsed laser comprising a frequency converter and characterized in that it comprises a device for reducing the induced temporal distortions according to claim 1, capable of reducing the distortions of temporal stretching induced in said sub-picosecond pulses by frequency conversion.

* * * * *